US011656913B2

(12) United States Patent
Liu et al.

(10) Patent No.: US 11,656,913 B2
(45) Date of Patent: May 23, 2023

(54) DEMAND-DRIVEN LOCALE MANAGEMENT

(71) Applicant: International Business Machines Corporation, Armonk, NY (US)

(72) Inventors: Su Liu, Austin, TX (US); Debbie Anglin, Leander, TX (US); Fan Yang, Beijing (CN); Boyi Tzen, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 17/098,599

(22) Filed: Nov. 16, 2020

(65) Prior Publication Data

US 2022/0156122 A1  May 19, 2022

(51) Int. Cl.
| | |
|---|---|
| G06F 3/0482 | (2013.01) |
| G06F 9/50 | (2006.01) |
| H04L 67/1097 | (2022.01) |
| G06F 8/65 | (2018.01) |
| G06F 8/61 | (2018.01) |
| G06F 8/70 | (2018.01) |

(52) U.S. Cl.
CPC .............. *G06F 9/5072* (2013.01); *G06F 8/61* (2013.01); *G06F 8/65* (2013.01); *G06F 8/70* (2013.01); *G06F 9/5077* (2013.01); *H04L 67/1097* (2013.01)

(58) Field of Classification Search
CPC .......................... G06F 9/44505; G06F 9/44526
See application file for complete search history.

(56) References Cited

U.S. PATENT DOCUMENTS

| | | | |
|---|---|---|---|
| 9,026,994 B2 | 5/2015 | Zhang et al. | |
| 9,338,071 B2 | 5/2016 | Erickson et al. | |
| 9,619,305 B2 | 4/2017 | Jiang et al. | |
| 10,600,014 B2 | 3/2020 | Gotoh et al. | |
| 2005/0038802 A1 | 2/2005 | White | |
| 2006/0167831 A1 | 7/2006 | Kamppari | |
| 2009/0293053 A1 | 11/2009 | Knatcher | |

(Continued)

FOREIGN PATENT DOCUMENTS

CN            101950251 A       1/2011

OTHER PUBLICATIONS

Ip.com, Locale Sensitive UI and Data Generation/Validation Cloud Services, Dec. 4, 2017, IPCOM000251780D.

(Continued)

*Primary Examiner* — Lewis A Bullock, Jr.
*Assistant Examiner* — Mohammad H Kabir
(74) *Attorney, Agent, or Firm* — Garg Law Firm, PLLC; Rakesh Garg; Nathan Rau (57) ABSTRACT

An embodiment includes establishing a demand threshold for adding a locale to an installation list based at least in part on selection data indicative of an input from a user. The embodiment also includes monitoring user inputs to a cloud computing environment so as to detect user inputs that include requests to install the locale. The embodiment also includes dynamically updating a demand score associated with the locale based on ongoing detection of locale installation requests during the monitoring of user inputs. The embodiment also includes automatically adding the locale to the installation list upon detecting that the demand score satisfied the demand threshold.

11 Claims, 6 Drawing Sheets

(56) References Cited

U.S. PATENT DOCUMENTS

| | | | |
|---|---|---|---|
| 2011/0209047 A1* | 8/2011 | Olsen | G06F 40/143 |
| | | | 715/234 |
| 2014/0365966 A1* | 12/2014 | Deng | G06F 40/53 |
| | | | 715/811 |
| 2015/0089375 A1 | 3/2015 | Liu et al. | |
| 2016/0357581 A1* | 12/2016 | Jiang | G06F 9/542 |

OTHER PUBLICATIONS

International Searching Authority, PCT/CN2021/123588, dated Jan. 13, 2022.

* cited by examiner

| TIME 502 | CONTAINER ID | INSTALLED LOCALE LIST 504 | PRIORITIZED ACCESSING GEO LOCATION 506 | NUMBER OF REQUESTED UNINSTALLED LOCALES 508 | MAJOR LOCALE OF USERS 510 | CDLM SCORE* 512 |
|---|---|---|---|---|---|---|
| TIME-1 (NO Ja_JP) | C00001 | EN_US.UTF-8-> ES_EN..UTF→ EN_CA.UTF-8_ | (USA(10), JAPAN(0)) | REQUEST(Ja_JP) =0 | (USER(USA, 80), USER(JAPAN, 0)) | CDLMSCORE (Ja_JP)=0 |
| TIME-2 (NO Ja_JP) | C00001 | EN_US.UTF-8-> ES_EN..UTF→ EN_CA.UTF-8_ | (USA(10), JAPAN(2)) | REQUEST(Ja_JP) =4 | (USER(USA, 60), USER(JAPAN, 20)) | CDLMSCORE (Ja_JP)=0.26 |
| TIME-3 (NO Ja_JP) | C00001 | EN_US.UTF-8-> ES_EN..UTF→ EN_CA.UTF-8_ | (USA(8), JAPAN(20)) | REQUEST(Ja_JP) =28 | (USER(USA, 40), USER(JAPAN, 40)) | CDLMSCORE (Ja_JP)=0.88 |
| TIME-4 (INSTALL Ja_JP) | C00001 | EN_US.UTF-8-> ES_EN..UTF→ EN_CA.UTF-8_ >Ja_JP.IBM-943 | (USA(8), JAPAN(60)) | REQUEST(Ja_JP) =100 | (USER(USA, 20), USER(JAPAN, 60)) | CDLMSCORE (Ja_JP)=2.2 |

FIG. 6

DEMAND-DRIVEN LOCALE MANAGEMENT

BACKGROUND

The present invention relates generally to a method, system, and computer program product for managing allocation of computing resources in a server cluster. More particularly, the present invention relates to a method, system, and computer program product for demand-driven locale management.

A data processing environment comprises a variety of hardware, software, and firmware networking components. A physical network, also called a data plane or an underlay, is a network of physical components where actual networking operations are performed and computational workloads are executed.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using virtual representations of the underlying physical components.

A physical computing machine can be represented and used in an SDN as a virtual device—a virtual machine (VM), which is also referred to as an Edge in a Network Virtualization Environment (NVE). An application configured to execute on an edge essentially is executed on the underlying physical computing machine in a similar manner.

In an SDN, because the actual physical networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN.

A VM comprises virtualized representations of real hardware, software, and firmware components available in a data processing system. The data processing system can have any number of VMs configured thereon, and utilizing any number of virtualized components therein. The data processing system is also referred to as a computing node, a compute node, a node, or a host.

SUMMARY

The illustrative embodiments provide for demand-driven locale management. An embodiment includes establishing a demand threshold for adding a locale to an installation list based at least in part on selection data indicative of an input from a user. The embodiment also includes monitoring user inputs to a cloud computing environment so as to detect user inputs that include requests to install the locale. The embodiment also includes dynamically updating a demand score associated with the locale based on ongoing detection of locale installation requests during the monitoring of user inputs. The embodiment also includes automatically adding the locale to the installation list upon detecting that the demand score satisfied the demand threshold. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A virtualized data processing environment is often referred to as a "cloud" that provides computing resources and computing services to several clients on an as-needed basis. Cloud computing services are available in a typical virtualized data processing environment according to different models, including Infrastructure as a Service (IaaS), Platform as a Service (PaaS), Software as a Service (SaaS), and Function as a Service (FaaS). These services are made available to an international customer base that continues to expand as global networking capabilities and infrastructure continues to improve.

A commonly used method of virtualization is container-based virtualization. Container-based virtualization, also called operating system virtualization, is an approach to virtualization in which a virtualization layer runs as an application within the operating system. A layer is a software package that participates in an image. An image is a binary package that can be installed on a hardware to instantiate a VM on the hardware. An image can include any number of software packages, whose layers are assembled together in the image as a monolithic binary. A single image can, but need not necessarily, represent an application.

In container-based virtualization, the operating system's kernel runs on a hardware node with several isolated application environments installed on top of it. The isolated application environments are called containers. In other words, a container is a running instance of an image of a VM in which the layers are distinguishable from one another. Container-based virtualization is a way to operate several VMs on the same host, where the VMs share the same kernel and memory space among themselves and with the host. The isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

Generally, a container is an image formed using a set of one or more layers. The layers typically include a layer for modifying the operating system to a specific version or specific customization, such as localization of the operating system. Localization allows the operating system (and other aspects of a computing service) to be customized for customers in different parts of the world. For example, the operating system can be adapted to various languages and regions without engineering changes. Localization is used to translate content such as user interface elements and documentation based on locale. Localization may also include other relevant changes to content such as display of numbers, dates, currency, and so on, based on locale.

On a typical computing platform, a "locale" is the part of a user's environment that brings together information about how to handle data that is specific to the user's particular region, language, or territory. Many operating systems and applications may be adapted to conform to a variety of regional preferences through the use of "locales" that designate the manner by which they perform processing on data, both with regard to inputs and outputs. These regional preferences are more than just a convenience for users. Without localization, the inability to properly set some regional preferences can lead to errors. For example, users may experience errors if the date formatting or monetary settings are different than expected. Also, localization prevents language barriers that would otherwise unnecessarily exclude some users from being able to use such systems and services.

The locale is typically part of the operating system. The locale used by an operating system is typically represented as an object file that is used to identify a set of cultural conventions. Examples of these cultural conventions include information on collation, character classification, date/time format, monetary symbols, and numeric representations. Applications executing on the computing platform use the locale to determine various location- or language-related default values. The locale is important for both applications and the platform on which the applications are running. For example, the platform may use the locale to determine a default language, a time zone, and a date format.

It is not uncommon for a user to find that the user's language or region does not coincide with any of the locales installed on an operating system. Operating systems typically include a default set of pre-installed default locales. However, the default locales may only include a small percentage of all available locales. For example, an operating system may include ten or fewer pre-installed default locales, while there may be hundreds of other locales available for the operating system that are not pre-installed.

In the situation where a user does not find their needed locale installed, the user must manually install the locale. Depending on the experience level of the user, the process of trying to manually install a locale can be difficult or inconvenient for several reasons. For example, an inexperienced user may be unaware of the ability to install a different locale, may be unfamiliar with the process of installing a locale, or may not be familiar with where additional locales can be found. Even an experienced user may encounter obstacles, for example the user may lack the necessary system permissions to install a locale. These problems can be difficult for a user to overcome, particularly since the user may be working with the operating system set up for an unfamiliar language while trying to resolve these issues.

One proposed solution is to pre-install all available locales. However, an operating system may have hundreds of locales available, which would consume more memory than desired. This is particularly true for cloud computing services where it is desirable to minimize the installation footprint of the operating system for performance purposes.

Thus, using today's technology, when a user finds that an operating system installed on a cloud service lacks their preferred or needed locale, the user's only option is to try to work through the process of manually finding and installing the locale. This manual process lacks the convenience and accessibility needed to provide cloud computing services to an international customer base that continues to expand as global networking capabilities and infrastructure continues to improve.

The illustrated embodiments address these issues by detecting a demand for a locale in a computing environment and automatically adding the locale to an installation list. In some embodiments, once the locale is on the installation list, the locale will automatically be installed each time a user or group of users launches an application in the computing environment, thus obviating the need for the user or group of users to manually install the locale.

An embodiment can be implemented as a combination of certain hardware components and a software application. An implementation of an embodiment, or one or more components thereof, can be configured as a modification of an existing controller (e.g., an existing SDN controller), a modification of an existing container manager, with a companion software application executing in some combination of (i) the controller or manager itself, (ii) a data processing system communicating with the controller or manager over short-range radio or a local area network (LAN), and (iii) a data processing system communicating with the controller or manager over a wide area network (WAN).

Generally, an embodiment can be configured to establish a demand threshold for adding a locale to an installation list according to selection data associated with user inputs. In some embodiments, a graphical user interface (GUI) provides the user with form elements that a user can populate or manipulate in order to input criteria for adding a locale to an installation list. Some such embodiments can be configured to generate the selection data based on the user-selected criteria. Non-limiting examples of criteria may include a minimum number of requests to install a locale (e.g., the locale installation must be requested at least five times), a specified window of time during which the minimum number of requests must be received (e.g., the locale installation must be requested at least three times in a six hour period), or the requests to install the locale must come from a specified group of users (e.g., the locale installation must be requested at least five times from users in a specified group).

An embodiment monitors user inputs to a cloud computing environment so as to detect user inputs that include requests to install a locale. In some embodiments, the monitoring of user inputs is conducted during a time period specified by the selection data. Embodiments can be configured to monitor user inputs in a variety of different ways. As a non-limiting example, in a cloud computing environment, monitoring is performed by nodes that provide monitoring results to a backend server. As another non-limiting example, in a cloud computing environment, monitoring is performed by a backend server that monitors user inputs by monitoring an application programming interface (API). In some embodiments, a backend server monitors user inputs in real time or in near real time.

An embodiment can be configured to dynamically update a demand score associated with the locale based on ongoing detection of locale installation requests during the monitoring of user inputs. In some embodiments, the demand score is reduced upon detecting that no request to install the locale has been detected for a specified period of time. For example, a criteria may require n requests to install a locale in m hours, and such embodiments may employ a sliding time window of m hours that reduces the demand score as detected requests age beyond m hours. In some embodiments, the selection data specifies a group of users, so the demand score is only updated when a detected of locale installation request is from a user in the specified group.

Some embodiments are configured such that the updating of the demand score involves weighing installation requests from some users or groups more than others. For example, some embodiments increase the demand score by a greater amount when the request is from a root user or a VIP user. Some such embodiments include detecting a user characteristic, such as whether the user is root or has a VIP account or status, and weighs requests from such users more than other users for purposes of calculating the demand score.

Some embodiments automatically add the locale to the installation list upon detecting that the demand score satisfied the demand threshold. In some embodiments, installation list is a list of locales that are automatically installed when applications, for example in the form of container instances, are launched. In some embodiments, before the locale is added to the installation list, the embodiment detects that the demand score satisfied the demand threshold, and verifies that the locale is not already on the installation list and or on a default locale list.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
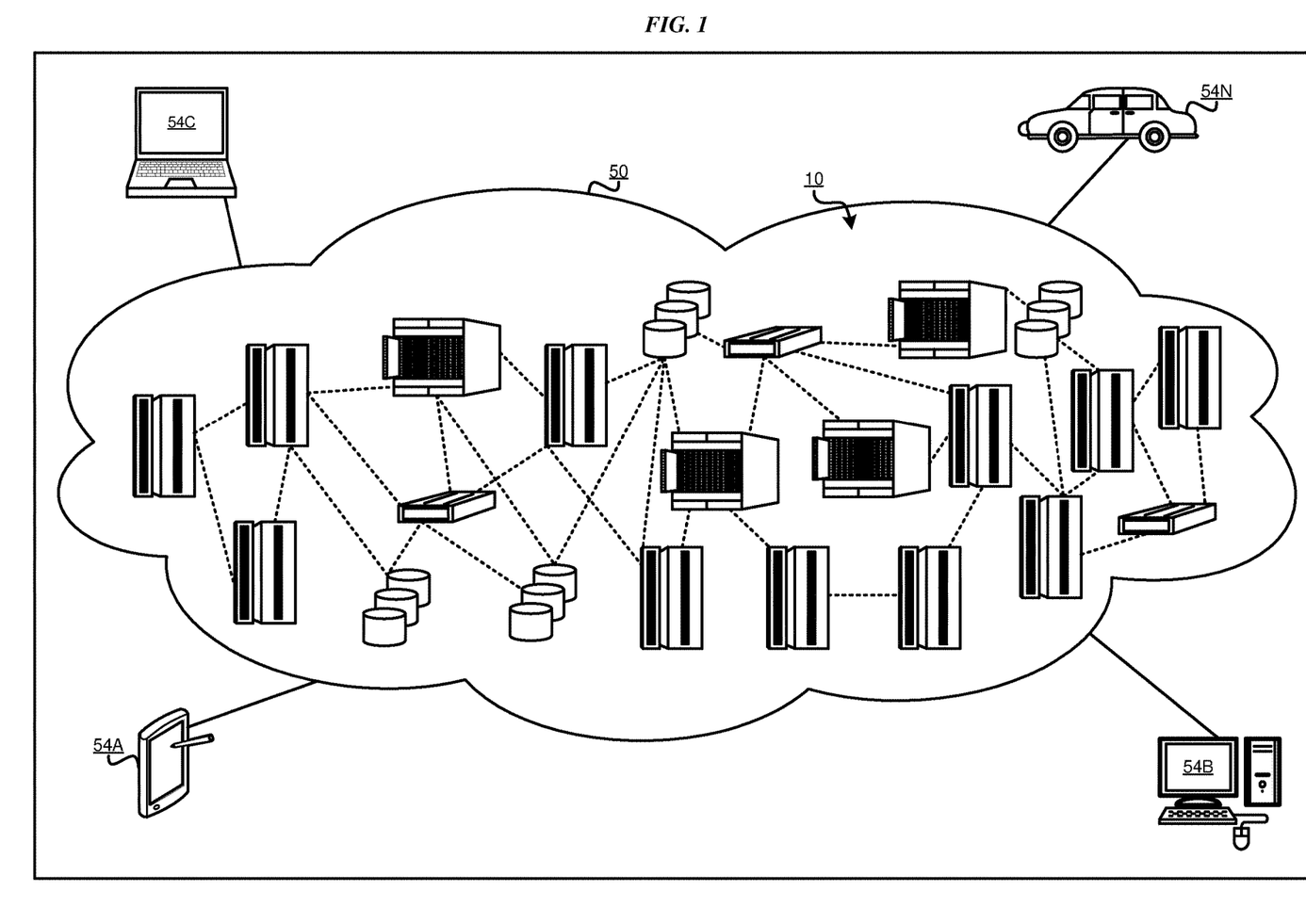
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
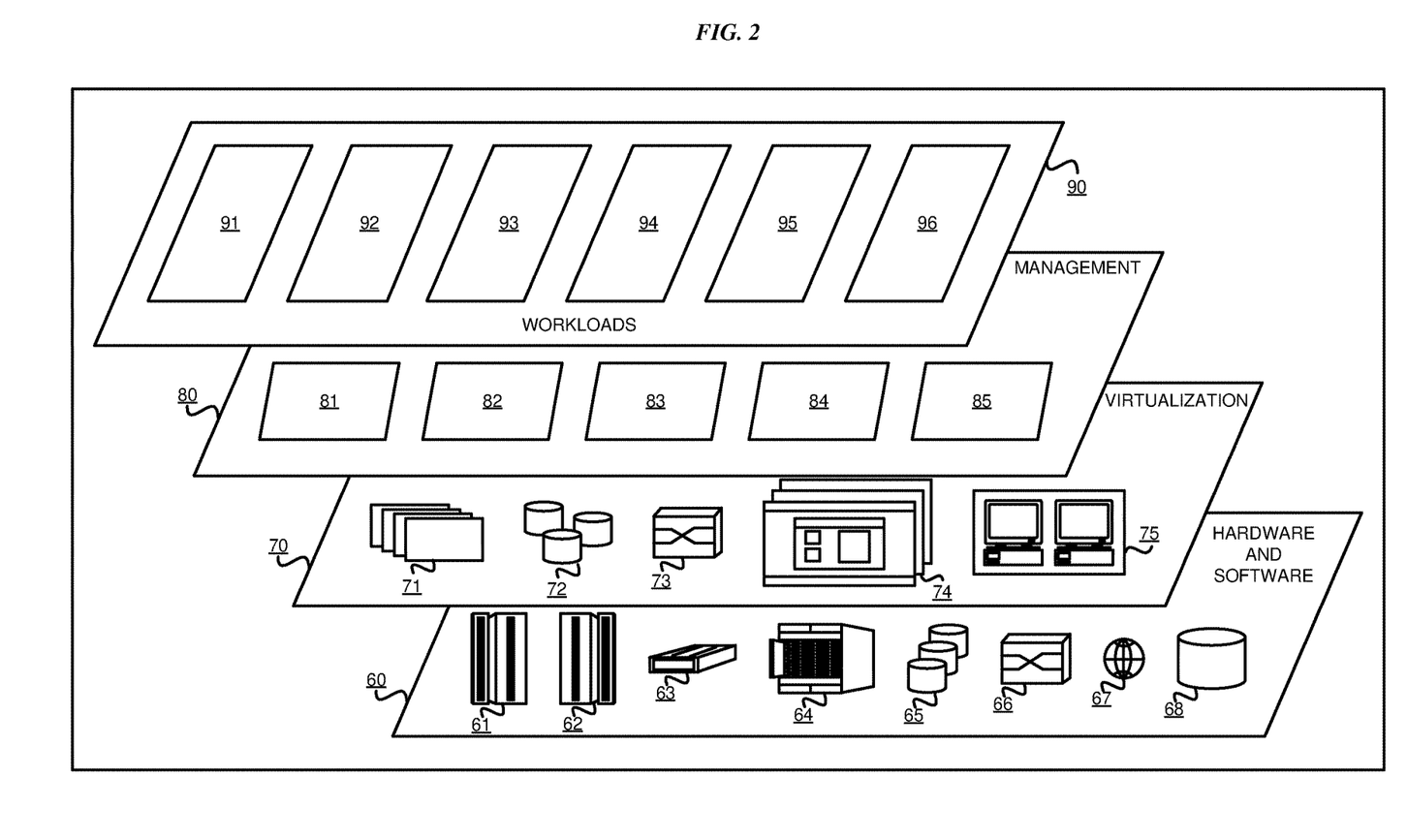
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and demand-drive locale management 96.

Figure 3:
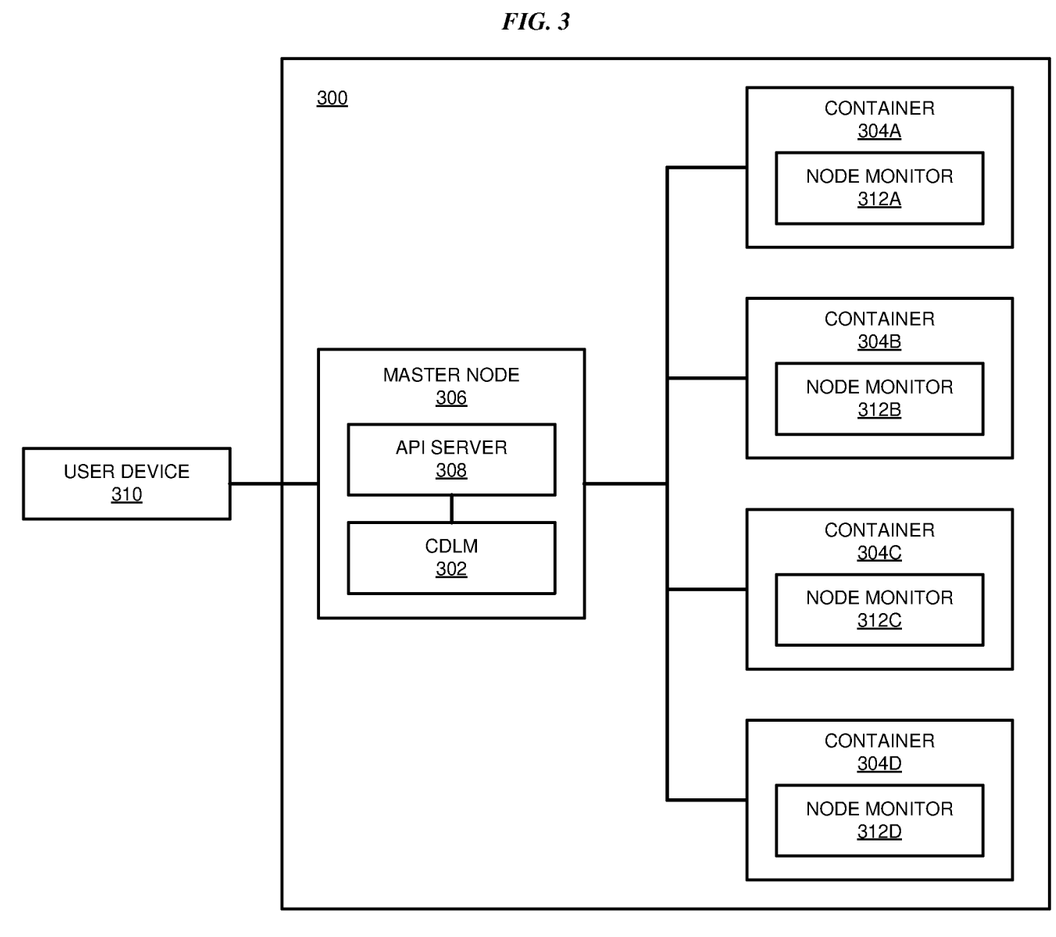
FIG. 3 depicts a block diagram of an example cloud computing environment that includes a Container Demand Locale Management (CDLM) system in accordance with an illustrative embodiment.

With reference to FIG. 3, this figure depicts a block diagram of an example cloud computing environment 300 that includes a Container Demand Locale Management (CDLM) system 302 in accordance with an illustrative embodiment. In some embodiments, the CDLM is deployed in workloads layer 90 of FIG. 2. By way of example, in some embodiments, CDLM 302 is implemented as demand-driven locale management 96 in FIG. 2.

In some embodiments, the environment 300 is a virtualized data processing environment that supports one or more different service models, such as IaaS, PaaS, SaaS, and FaaS. In some embodiments, at least a subset of the components of environment 300 may be implemented by one or more container nodes 304A-304D, referred to collectively herein as container nodes 304, and a master node 306. Embodiments of the environment 300 may include hundreds or thousands of container nodes 304 and multiple master nodes 306. The master node 306 hosts the applications that support the containers nodes 304, including an application programming interface (API) server 308 and the CDLM 302. In some embodiments, container nodes 304 and master node 306 communicate via network connections as part of the cloud computing environment 300. In some embodiments, the container nodes 304 communicates with the CDLM 302 via the API server 308. In some embodiments, the user device 310 communicates with the CDLM 302 via the API server 308.

In the illustrated embodiment, the CDLM 302 allows a user or admin to set and change on-demanding criteria. The on-demanding criteria includes a rule or set of rules for adding a locale to an installation list. In some embodiments, the on-demanding criteria includes a demand threshold. A non-limiting example of on-demanding criteria for adding a locale to an installation list would require receiving more than three normal user requests for the locale in one hour. In some embodiments, the criteria may be for a single user or for a group of users or for some other designation of users. In some embodiments, once the criteria has been met, the locale will be automatically added after to the installation list and thereafter automatically installed when the designated user or group launches a container or application in the cloud computing environment 300. In some embodiments, the CDLM 302 provides a graphical user interface (GUI) that allows a user to set and manage on-demanding criteria.

In some embodiments, the CDLM 302 keeps track of on-demanding criteria, such as a demand threshold specified by a user via user device 310. For example, in some embodiments, the CDLM 302 saves the on-demanding criteria in a service profile. In some embodiments, the service profile includes cloud service settings related to language and locale features. In some such embodiments, the locale file set repository database also stores, and provides CDLM 302 access to, locales that are not installed by default in the container instances. In some embodiments, the CDLM 302 also stores user profiles including user locale preference. In some embodiments, the CDLM 302 also stores a list of locales already installed in the container instances.

In some embodiments, the CDLM 302 tracks locale demanding information, for example by monitoring user inputs to the nodes 304 so as to detect user inputs that include requests to install the locale. In some embodiments, the CDLM 302 tracks locale demanding information in real time or near real time, for example using a backend monitoring application on the CDLM 302. For example, if the CDLM 302 detects a user input such as "LANG=ja_JP" and then runs their application, that information indicates that the user needs the specified language locale, which is tracked by the CDLM 302.

In some embodiments, the CDLM 302 calculates demand scores, for example by dynamically updating a demand score associated with a locale based on ongoing detection of locale installation requests while monitoring user inputs. In some embodiments, the CDLM 302 allows a user to define and modify an algorithm to calculate a locale demand score for each of the containers 304. In some such embodiments, the CDLM 302 may weigh requests by certain designated users or user groups (e.g., root user or VIP group) higher than requests by other users for purposes of calculating demand, higher than requests by other users.

In some embodiments, the CDLM 302 adds locales to an installation list, for example by adding top demanding locales according to predefined on-demanding criteria. In such embodiments, the CDLM 302 automatically installs locales on the installation list when an application is launched in the cloud computing environment.

In the illustrated embodiment, the master node 306 performs cluster control functions such as, but not limited to scheduling workloads on the container nodes 304 and cluster configuration management. In accordance with one or more embodiments of the present invention the master node 306 implements the CDLM 302 described herein.

In the illustrated embodiment, the worker nodes 304A-304D include respective node monitors 321a-312d. In some embodiments, the node monitors 312A-312D monitor user inputs to respective nodes 304A-304D so as to detect user inputs that include requests to install the locale. In some such embodiments, the node monitors 312 report detected user input to the CDLM 302 in the master node 308 via the API server 308 whenever the user input includes a locale installation request.

Figure 4:
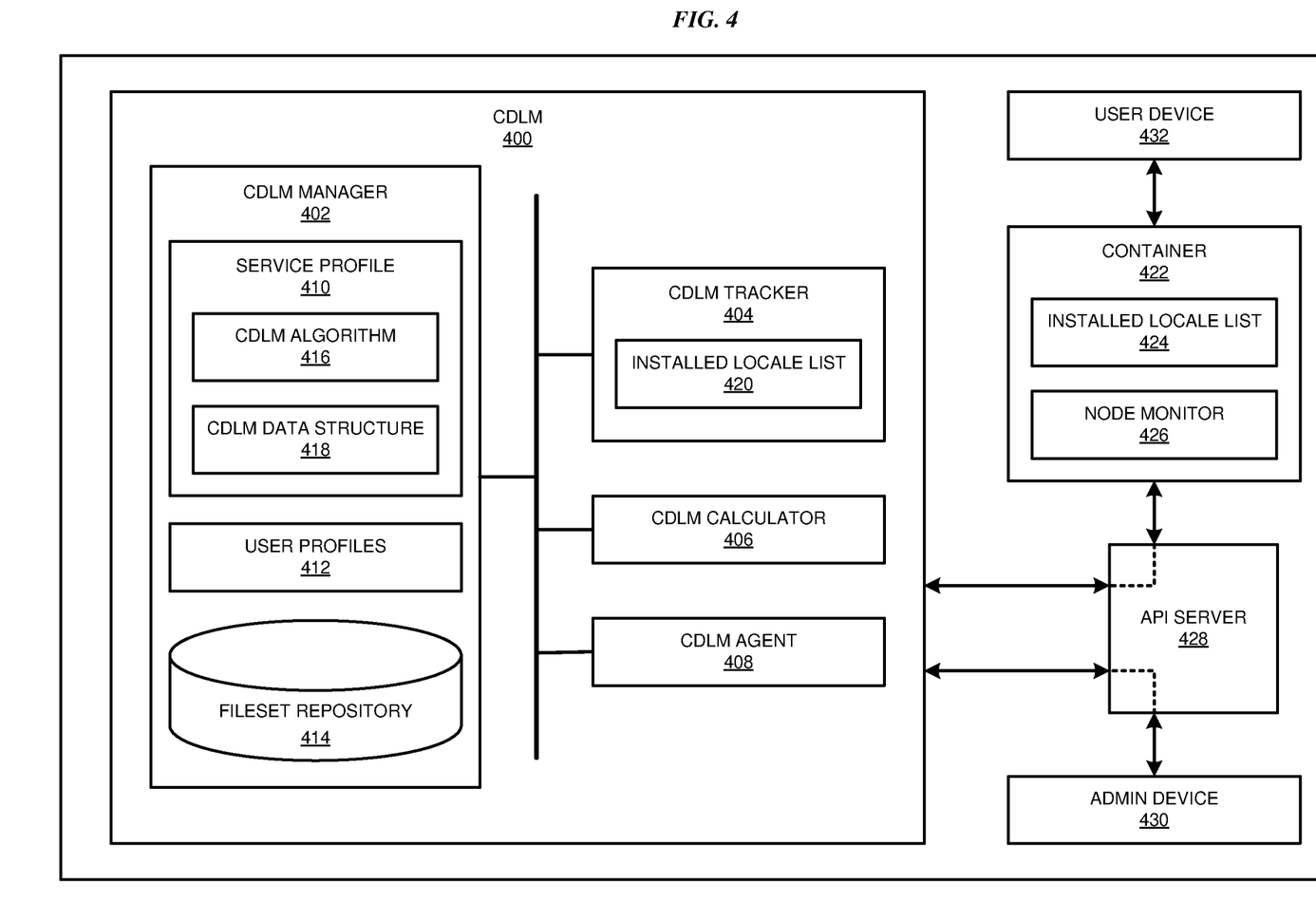
FIG. 4 depicts a block diagram of an example CDLM in accordance with an illustrative embodiment.

With reference to FIG. 4, this figure depicts a block diagram of an example CDLM 400 in accordance with an illustrative embodiment. In a particular embodiment, CDLM 400 is an example of CDLM 302 of FIG. 3.

In the illustrated embodiment, CDLM 400 includes a CDLM manager 402, a CDLM tracker 404, a CDLM calculator 406, and a CDLM agent 408. The CDLM manager 402 includes a fileset repository 414 that stores all available language-locale package for installation. The CDLM manager 402 also includes a service profile updater 410, and a user profiles updater 412. The service profile updater 410 includes a CDLM algorithm updater 416 and a CDLM data structure updater 418. The CDLM tracker 404 includes an installed locale list 420. In alternative embodiments, the CDLM 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the CDLM 400 communicates with a container node 422 and an admin device 430 via an API server 428. In the illustrated embodiment, a user device 432 communicates with the container node 422 via network connections.

In the illustrated embodiment, the CDLM manager 402 allows a user or admin, for example via admin device 430, to set and change on-demanding criteria. In the illustrated embodiment, the service profile updater 410 of the CDLM manager 402 updates and stores the criteria in the service profile 410. The on-demanding criteria includes a rule or set of rules for adding a locale to an installation list. In some embodiments, the on-demanding criteria includes a demand threshold. A non-limiting example of on-demanding criteria for adding a locale to an installation list would require receiving more than three normal user requests for the locale in one hour. In some embodiments, the criteria may be for a single user or for a group of users or for some other designation of users. In some embodiments, once the criteria has been met, the CDLM data structure updater 418 of the CDLM manager 402 updates a CDLM data structure stored in the service profile 410 to track the locale on the installation list so that the CDLM agent 408 will automatically install the locale when the designated user or group launches a container or application on a container 422. In some embodiments, once the criteria has been met, the CDLM manager 402 updates a installed locale list 424 on the container 422 to include the locale on the installation list so that the CDLM agent 408 will automatically install the locale when the designated user or group launches a container or application on a container 422.

In some embodiments, the CDLM manager 402 keeps track of on-demanding criteria, such as a demand threshold specified by a user via admin device 430. For example, in some embodiments, the service profile updater 410 saves the on-demanding criteria in a service profile. In some such embodiments, the fileset repository 414 stores, and provides CDLM 400 access to, locales that are not installed by default in the container instances (i.e., all language-locale packages that can be installed into a cloud node but are not presently installed), user profiles including user locale preference, and a list of locales already installed in the container instances.

In some embodiments, the CDLM tracker 404 tracks locale demanding information, for example by monitoring user inputs to the container node 422 so as to detect user inputs that include requests to install a locale. In some embodiments, the CDLM tracker 404 tracks locale demanding information in real time or near real time. For example, if the CDLM tracker 404 detects a user input such as "LANG=ja_JP" (or similar language-locale request commands) and then runs their application, that information indicates that the user needs the specified language locale, which is tracked by the CDLM tracker 404.

In some embodiments, the CDLM calculator 406 calculates demand scores, for example by dynamically updating a demand score associated with a locale based on ongoing detection by the CDLM tracker 404 of locale installation requests while monitoring user inputs. In some embodiments, the CDLM 400 allows a user to define and modify an algorithm to calculate a locale demand score for each of the container 422. In some such embodiments, the CDLM calculator 406 may weigh requests by certain designated users or user groups (e.g., root user or VIP group) higher than requests by other users for purposes of calculating demand, higher than requests by other users.

In some embodiments, the CDLM data structure updater 418 of the CDLM manager 402 updates a CDLM data structure stored in the fileset repository 414 to include the locale on the installation list so that the CDLM agent 408 will automatically install the locale. In some embodiments, the CDLM agent 408 automatically installs locales on the installation list when an application is launched in the cloud computing environment.

In the illustrated embodiment, the container 422 includes a node monitor 426. In some embodiments, the node monitor 426 monitors user inputs to container 422 so as to detect user inputs that include requests to install the locale. In some such embodiments, the node monitor 426 reports detected user inputs to the CDLM 400 via the API server 428 whenever the user input includes a locale installation request.

Figure 5:
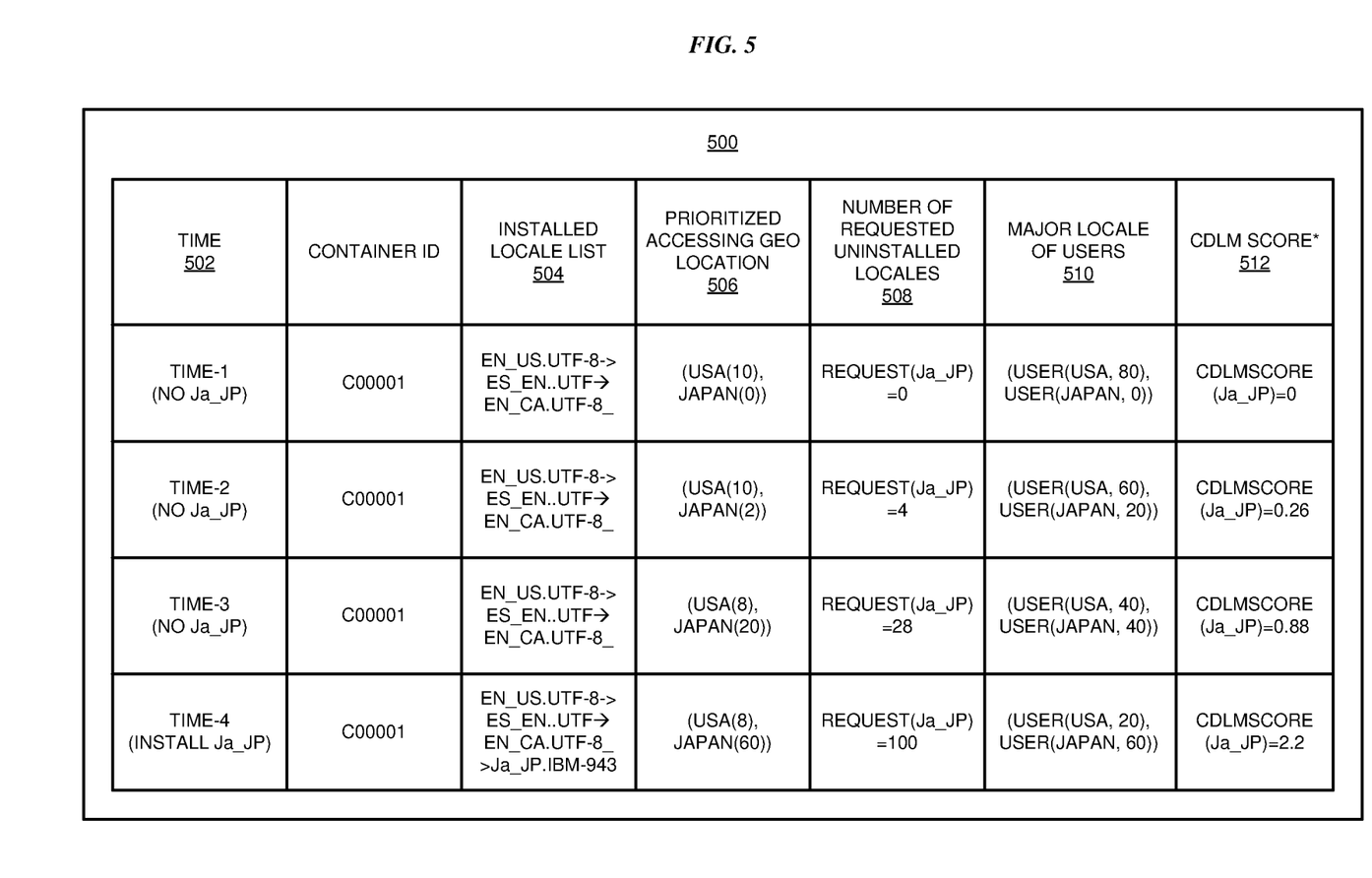
FIG. 5 depicts a table of historical container node usage data in accordance with an illustrative embodiment.

With reference to FIG. 5, this figure depicts a table 500 of historical container node usage data in accordance with an illustrative embodiment. In some embodiments, the data in table 500 is generated by a CDLM, such as CDLM 400 in FIG. 4.

The illustrated embodiment shows historical data for a single container (Container ID C00001) over four time periods corresponding to the four rows Time-1 through Time-4, for example where each row represents three hours. Actual historical data may include many more time periods of information, and may include historical data for many more containers, but for illustrative purposes twelve hours of information for a single container are shown in this example. As a non-limiting example, the requirements for the container C00001 for a adding a locale to an installation list is that the demand score must be greater than or equal to 2.0.

In the illustrated embodiment, in addition to the Container ID column, which lists a unique identifier for a container associated with other data on the corresponding row, includes a time column 502 for indicating time periods associated with each row, an Installed Locale List column 504 for indicating the locales that are automatically installed on the associated container, a Prioritized accessing Geo Location column 506 for indicating geographic regions from which users accessed the associated container, an uninstalled locales column 508 for indicating number totals of requested uninstalled locales by locale for each time period, a major locale column 510 for indicating the major language of the users, and a CDLM score column 512 for listing a CDLM score for each time period. for Container ID, which is a unique identifier for a container associated with other data. Actual historic data may include many more columns of different types of data. In some embodiments, a CDLM tracker (e.g., CDLM tracker 404 of FIG. 4) collects the data for columns 504-510 and a CDLM calculator (e.g., CDLM calculator 406 of FIG. 4) calculates the CDLM scores in column 512.

In the illustrated embodiment, during the time period Time-1, the data indicates that USA locales that are already installed are used but no Japan locales are requested, so the CDLM tracker 404 continues tracking. During time periods Time-2 and Time3, the number of users requesting the uninstalled Japan locale is increasing, but the CDLM score has not reached the threshold value of 2.0. During the time period Time-4, the number of users requesting the uninstalled Japan locale continues to increase such that the CDLM score of 2.2 exceeds the score threshold value of 2.0. As a result, the locale for Ja_JP.IBM-943 corresponding to the requested Japan locale that exceeds the CDLM threshold value is automatically added to the installation list.

Figure 6:
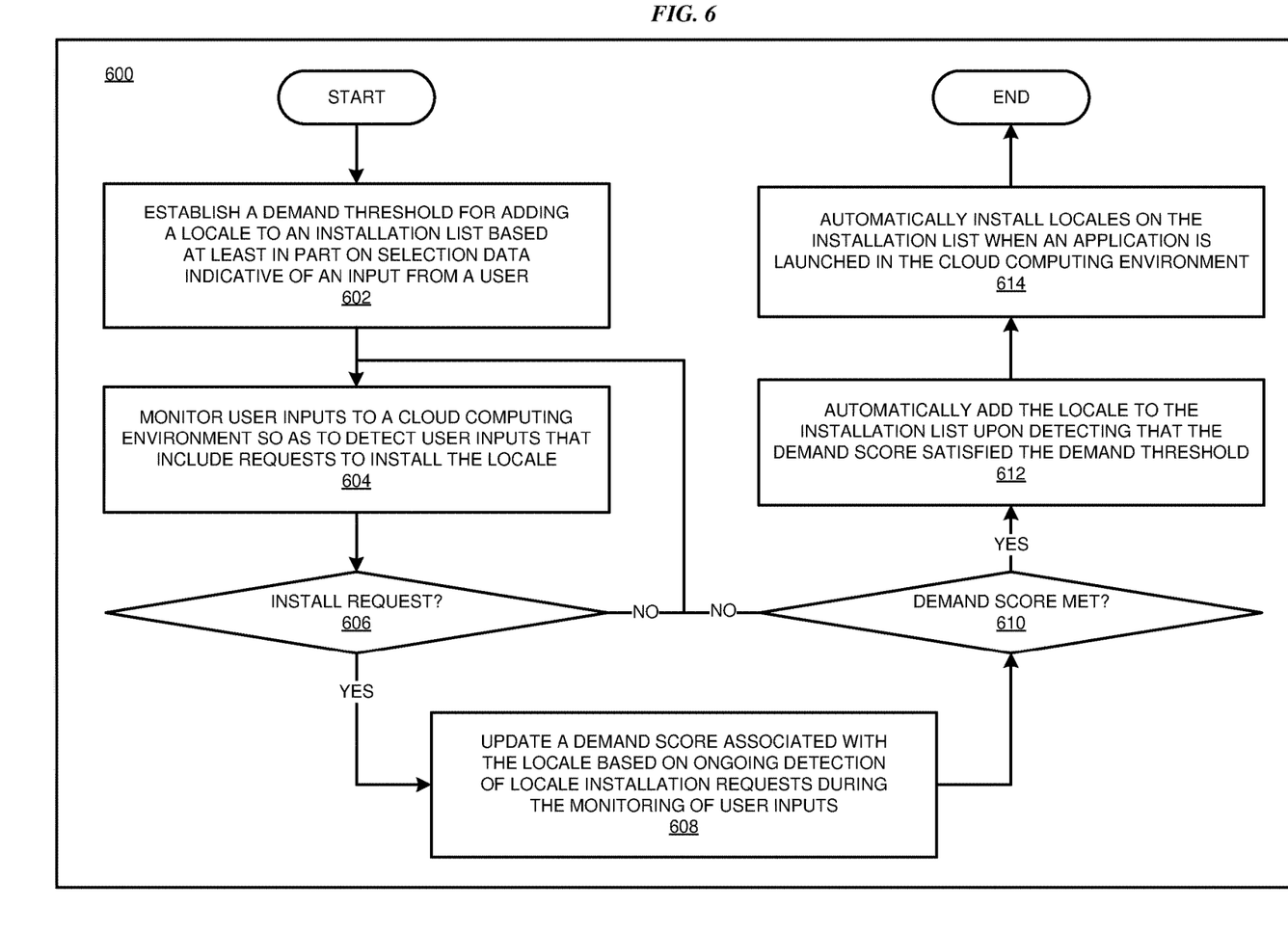
FIG. 6 depicts a flowchart of an example process for demand-driven locale management.

With reference to FIG. 6, this figure depicts a flowchart of an example process 600 for demand-driven locale management in accordance with an illustrative embodiment. In some embodiments, the process 600 is performed by a CDLM deployed in a cloud computing environment, for example CDLM 302 in cloud computing environment 300 of FIG. 3 or CDLM 400 of FIG. 4.

In an embodiment, at block 602, the process establishes a demand threshold for adding a locale to an installation list based at least in part on selection data indicative of an input from a user.

In an embodiment, at block 604, the process monitors user inputs to a cloud computing environment so as to detect user inputs that include requests to install the locale In an embodiment, at block 606, the process determines whether a locale request has been made. If not, the process continues monitoring at block 604.

In an embodiment, if the process detects a locale request at block 606, then the process continues to at block 608, where the process updates a demand score associated with the locale based on ongoing detection of locale installation requests during the monitoring of user inputs.

In an embodiment, at block 610, the process determines whether a demand threshold (or CDLM threshold) value has been satisfied. If not, the process continues monitoring at block 604.

In an embodiment, if the process determines that the demand threshold (or CDLM threshold) value has been reached at block 610, the process continues to at block 612, where the process automatically adds the locale to the installation list upon detecting that the demand score has been satisfied.

In an embodiment, at block 614, the process automatically installs locales on the installation list when an application is launched in the cloud computing environment.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   establishing a demand threshold for adding a locale to an installation list based at least in part on a request to install the locale from a plurality of users of a cloud computing environment;
   dynamically monitoring user inputs from the plurality of users during an adjustable window of time so as to detect respective requests to install the locale from each of the plurality of users, wherein the plurality of users includes a first user and a second user, and wherein the monitoring of the user inputs further comprises, for the first user and the second user that are requesting the locale:
      dynamically updating the demand score associated with the locale in response to ongoing detection of the locale installation requests from the plurality of users, wherein the updating of the demand score comprises:
         determining a user group associated with the first user and second user;
         increasing a demand score for the locale by a first amount in response to determining that the first user belongs to a first group of users;
         increasing the demand score by a second amount that is less than the first amount in response to determining that the second user belongs to a second group of users; and
         reducing the demand score upon detecting that no request to install the locale from the first user or second user has been detected within a specified period of time; and
      automatically adding the locale to the installation list upon detecting that the demand score satisfies the demand threshold; and
      automatically installing, subsequent to automatically adding the locale to the installation list, locales on the installation list when an application is launched in the cloud computing environment.

2. The method of claim 1, further comprising:
   automatically installing the locale while the locale is on the installation list when a containerized application is launched by any of the plurality of users in the cloud computing environment.

3. The method of claim 1, wherein the updating of the demand score comprises:
   detecting a user characteristic associated with a detected request to install the locale, and
   increasing the demand score based on the detected user characteristic.

4. The method of claim 3, wherein the detecting of the user characteristic comprises detecting a root user.

5. The method of claim 4, wherein the increasing of the demand score based on the detected user characteristic comprises increasing the demand score by an amount greater than increases for non-root users.

6. The method of claim 1, wherein the installation list is a list of locales that are automatically installed when an instance of a container is launched, and
   wherein the monitoring of user inputs comprises storing, in a portion of a data table associated with a unique identifier of the container, data indicative of a number of the requests.

7. The method of claim 1, further comprising:
   detecting that the demand score satisfied the demand threshold; and
   verifying, responsive detecting that the demand score satisfied the demand threshold, that the locale is not already on the installation list and that the locale is not on a default locale list.

8. A computer program product comprising one or more computer readable storage media, and program instructions collectively stored on the one or more computer readable storage media, the program instructions executable by a processor to cause the processor to perform operations comprising:
   establishing a demand threshold for adding a locale to an installation list based at least in part on a request to install the locale from a plurality of users of a cloud computing environment;
   dynamically monitoring user inputs from the plurality of users during an adjustable window of time so as to detect respective requests to install the locale from each of the plurality of users, wherein the plurality of users includes a first user and a second user, and wherein the monitoring of the user inputs further comprises, for the first user and the second user that are requesting the locale:
      dynamically updating the demand score associated with the locale in response to ongoing detection of the locale installation requests from the plurality of users, wherein the updating of the demand score comprises:
         determining a user group associated with the first user and second user;
         increasing a demand score for the locale by a first amount in response to determining that the first user belongs to a first group of users;
         increasing the demand score by a second amount that is less than the first amount in response to determining that the second user belongs to a second group of users; and
         reducing the demand score upon detecting that no request to install the locale from the first user or second user has been detected within a specified period of time; and
      automatically adding the locale to the installation list upon detecting that the demand score satisfies the demand threshold; and
   automatically installing, subsequent to automatically adding the locale to the installation list, locales on the installation list when an application is launched in the cloud computing environment.

9. The computer program product of claim 8, further comprising:
   automatically installing locales on the installation list when a containerized application is launched in the cloud computing environment.

10. A computer system comprising a processor and one or more computer readable storage media, and program instructions collectively stored on the one or more computer readable storage media, the program instructions executable by the processor to cause the processor to perform operations comprising:

establishing a demand threshold for adding a locale to an installation list based at least in part on a request to install the locale from a plurality of users of a cloud computing environment;

dynamically monitoring user inputs from the plurality of users during an adjustable window of time so as to detect respective requests to install the locale from each of the plurality of users, wherein the plurality of users includes a first user and a second user, and wherein the monitoring of the user inputs further comprises, for the first user and the second user that are requesting the locale:

dynamically updating the demand score associated with the locale in response to ongoing detection of the locale installation requests from the plurality of users, users during the monitoring of user inputs, wherein the updating of the demand score comprises determining a user group to which the first user belongs and determining an amount by which to update the demand score based on the thus determined user group; and comprises:

determining a user group associated with the first user and second user;

increasing a demand score for the locale by a first amount in response to determining that the first user belongs to a first group of users;

increasing the demand score by a second amount that is less than the first amount in response to determining that the second user belongs to a second group of users; and reducing the demand score upon detecting that no request to install the locale from the first user or second user has been detected within a specified period of time; and automatically adding the locale to the installation list upon detecting that the demand score satisfies the demand threshold, threshold; and automatically installing, subsequent to automatically adding the locale to the installation list, locales on the installation list when an application is launched in the cloud computing environment.

11. The computer system of claim 10, further comprising:
automatically installing locales on the installation list when a containerized application launched in the cloud computing environment.

\* \* \* \* \*